Mar. 20, 1923.
L. H. CALAWAY
CONNECTING ROD COUPLING
Filed Apr. 17, 1922
1,449,034
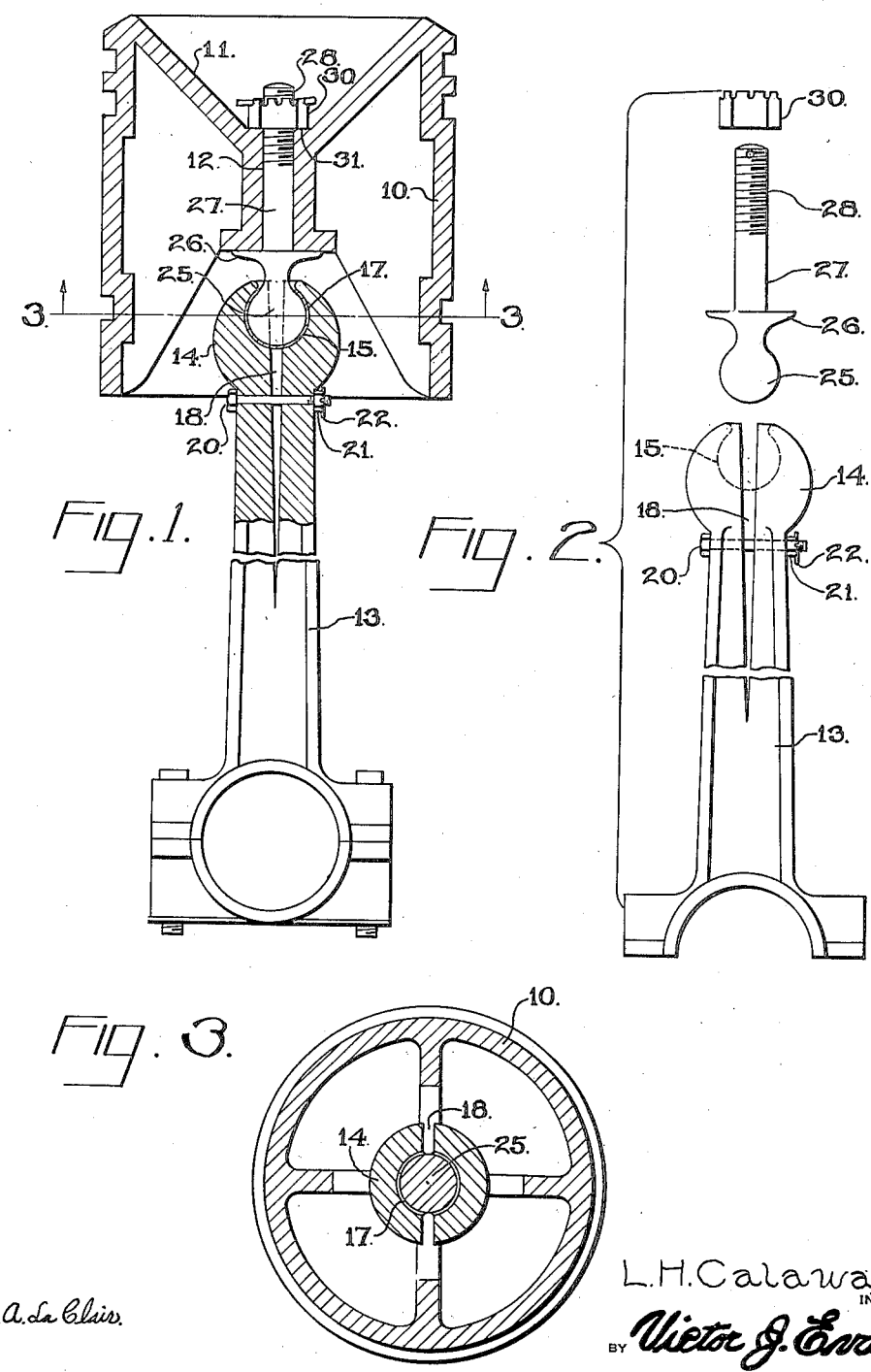
L. H. Calaway
INVENTOR
BY Victor J. Evans
ATTORNEY
WITNESS: H. A. La Clair Patented Mar. 20, 1923.

1,449,034

UNITED STATES PATENT OFFICE.

LEONARD H. CALAWAY, OF FULLERTON, CALIFORNIA.

CONNECTING-ROD COUPLING.

Application filed April 17, 1922. Serial No. 553,363.

*To all whom it may concern:*

Be it known that I, LEONARD H. CALAWAY, a citizen of the United States, residing at Fullerton, in the county of Orange and State of California, have invented new and useful Improvements in Connecting-Rod Couplings, of which the following is a specification.

This invention relates to a coupling for the connecting rod through which power is transmitted from the piston of an internal combustion engine, or the like, to the crank shaft.

One object is to provide a particular form of connection which will permit of universal movement between the piston and connecting rod, so that freedom of movement in all directions is possible.

A further object is to provide a coupling of this type in which one of the elements may be adjusted to permit of taking up wear.

A further object is to provide a coupling in which excessive strains are to a large extent avoided due to the provision for universal movement, and liability of breakage is thereby reduced, and therefore the liability of seriously damaging the walls of the cylinders by movement of the separated parts.

A still further object is to provide a connecting rod including a socket, a slotted portion communicating with the socket, and an adjusting screw for varying the size of the sockets, and an anti-friction lining for the socket members.

With the foregoing and other objects in view, the invention consists in the novel construction and arrangement of elements described and claimed, it being understood that modifications may be made within the scope of the claim without departing from the spirit of invention.

In the drawings, Figure 1 is a view in vertical section and elevation, showing the improved connection between the piston and piston rod; Figure 2 is a view in elevation showing certain of the elements of Figure 1 detached; Figure 3 is a section on line 3—3 of Figure 1.

The piston 10 is preferably provided with a concave portion 11 and is further provided with a central bore 12.

The connecting rod is designated 13 and includes an enlarged end 14 having therein a socket 15 provided with a lining of anti-friction material, the lining being shown at 17.

The element 13 is slotted as shown at 18, the slot communicating with the socket and permitting adjustment for varying the size of the socket as may become necessary from time to time due to any slight wear which may occur.

An adjusting screw or bolt 20 passes through the slotted portions of element 13, the bolt carrying a nut 21 retained by a cotter pin 22.

The cooperating element of the coupling comprising a ball member 25 and a flanged portion 26. Formed integrally with these elements is a shaft 27, threaded as shown at 28. The shank passes through the bore 12, and the threaded end is engaged by a nut 30 contacting with the portion 31 of the piston head.

The construction specified is especially effective for the purpose intended and should remain in good condition for an extended period. When adjustment is eventually required, this may be effected in the simplest possible manner.

Having thus described the invention, I claim:

The combination with a piston head having a central longitudinal bore, of an element including a shank portion extending through the bore, an engaging device connected with the shank and contacting with the piston, a ball member formed on the shank, a connecting rod having a socket for receiving the ball member, and having a slot communicating with the socket, an anti-friction lining for the socket, and means passing through the slotted end of the rod for varying the size of the socket and taking up wear.

In testimony whereof I affix my signature.

LEONARD H. CALAWAY.